US012664016B2

(12) United States Patent
Remahl et al.

(10) Patent No.: US 12,664,016 B2
(45) Date of Patent: Jun. 23, 2026

(54) PROCESS LAUNCH CONSTRAINTS

(71) Applicant: Apple Inc., Cupertino, CA (US)

(72) Inventors: David P. Remahl, Woodside, CA (US);
Kyle C. Brogle, San Francisco, CA
(US); Robert J. Kendall-Kuppe,
Rockville, MD (US); Pavlo Malynin,
Fremont, CA (US); **Geoffrey
McCormack**, San Jose, CA (US)

(73) Assignee: Apple Inc., Cupertino, CA (US)

( * ) Notice: Subject to any disclaimer, the term of this
patent is extended or adjusted under 35
U.S.C. 154(b) by 439 days.

(21) Appl. No.: 18/327,553

(22) Filed: Jun. 1, 2023

(65) Prior Publication Data

US 2023/0393888 A1     Dec. 7, 2023

Related U.S. Application Data

(60) Provisional application No. 63/365,868, filed on Jun.
5, 2022.

(51) Int. Cl.
*G06F 9/48* (2006.01)
*G06F 12/14* (2006.01)

(52) U.S. Cl.
CPC .............. *G06F 9/485* (2013.01); *G06F 12/14*
(2013.01)

(58) Field of Classification Search
CPC .......... G06F 12/51; G06F 9/545; G06F 9/445
See application file for complete search history.

(56) References Cited

U.S. PATENT DOCUMENTS

| | | | | |
|---|---|---|---|---|
| 2013/0298133 A1* | 11/2013 | Jones | .................... | G06F 9/5027 |
| | | | | 718/104 |
| 2014/0258700 A1* | 9/2014 | England | ................ | G06F 21/572 |
| | | | | 713/2 |
| 2016/0350529 A1* | 12/2016 | Kerr | ........................ | G06F 21/51 |

(Continued)

FOREIGN PATENT DOCUMENTS

WO      WO-2017052555 A1 *   3/2017   ............. G06F 9/545

OTHER PUBLICATIONS

"Script management with launchd in Terminal on Mac", https://
support.apple.com/guide/terminal/script-management-with-launchd-
apdc6c1077b-5d5d-4d35-9c19-60f2397b2369/mac; 2 pages. [Retrieved
Jun. 1, 2023].

(Continued)

*Primary Examiner* — Edward J Dudek, Jr.
(74) *Attorney, Agent, or Firm* — Kowert, Hood, Munyon,
Rankin & Goetzel, P.C.; Mark D. Seegers; Dean M.
Munyon

(57)                 ABSTRACT

A kernel of an operating system receives a request from a
parent process (e.g., an exec or spawn system call) to launch
a child process that executes a binary. The kernel identifies
a process-specific launch constraint, which is a precondition
for launching the child process. The kernel evaluates the
constraint, which can match against any type of system state
or variable, including the process's location on disk, pro-
tection on disk, and how the process is to be launched. The
kernel can then determine whether to launch the child
process, thus permitting the child process to be scheduled for
execution by the operating system. Launch constraints can
be used both for a child process to impose preconditions on
the parent process, and vice versa. Launch constraints can be
included in the launch request, embedded in the binary, or
located elsewhere, such as in a trust cache in kernel memory.

20 Claims, 20 Drawing Sheets

(56)  References Cited

U.S. PATENT DOCUMENTS

| | | | |
|---|---|---|---|
| 2017/0286673 A1* | 10/2017 | Lukacs | G06F 21/566 |
| 2018/0113735 A1* | 4/2018 | Lu | G06F 9/5016 |
| 2019/0108038 A1* | 4/2019 | Liu | G06F 9/45533 |
| 2021/0200862 A1* | 7/2021 | Lotspeich | G06F 21/54 |
| 2022/0197992 A1* | 6/2022 | Waterson | G06F 21/57 |

OTHER PUBLICATIONS

Spawnp( )—Spawn Process with Path; IBM; https://www.ibm.com/docs/en/i/7.1?topic=ssw_ibm_i_71/apis/spawnp.html; last updated Mar. 8, 2021, 18 pages.

\* cited by examiner

200 kernel
space
104

Launch
Module
120

Launch
Constraints
130

Binary
140

Signature   242 user
space
102 launch
command
110

270 kernel
space
*104*

*Launch
Module
120*

*Binary
140* user
space
*102*

*launch
command 110
(with launch
constraints
130)*

400

401 — Top Level    402

| Key | Value Type | Expected Values | Notes |
|-----|-----------|-----------------|-------|
| ccat | integer | 0-5, 7 | This a Constraint Category Identifier. See Constraint Categories Below |
| comp | integer | 1 | The oldest version of the Lightweight Code Requirements implementation that this blob is compatible with |
| reqs | dictionary | See Requirements Dictionary | |
| vers | integer | 1 | The version of this Lightweight Code Requirement |

| Fact Name Keys | Value Type | Expected Values | Notes |
|---|---|---|---|
| internal | Boolean | True/False | Matches True on Internal OSes |
| entitlements | $query | This fact should include a dictionary with the $query operator and an entitlements query dictionary. | |
| in-tc-with-constraint-category | Boolean | True/False | Matches True when this code is found in a Version 2 Trustcache. Matches False if the code is not in a trustcache or is found in a Version 1 Trustcache . |
| is-init-proc | Boolean | True/False | Matches True when the queried process is known to xnu as the current initproc. (launchd) |
| is-sip-protected | Boolean | True/False | Matches True when the main executable for the process being matched has the SF_RESTRICTED flag set in the file system. |
| launch-type | Integer $gt $gte $lt $lte $in | 0: None 1: System Service | Only meaningful for launch constraints on the process being launched (not parent or responsible). Matches when the parent process sets the expected launch type via spawn attribute. |
| on-authorize-authapfs-volume | Boolean | True/False | Matches True when the main executable for the process being matched resides on the System Volume or a SPLAT Cryptex mounted at an expected Graft point. |
| on-system-volume | Boolean | True/False | Matches True when the main executable of the process being matched resides on the System Volume . |
| signing-identifier | String $in | Any string | Matches when the signing identifier of the process matches the supplied string or satisfies the supplied operator |
| sip-enabled | Boolean | True/False | Matches TRUE when SIP File System Protections are enabled on the system (always matches False on embedded) |
| team-identifier | String $in | Any string | Matches when the team identifier of the process matches the supplied string or satisfies the supplied operator |
| validation-category | Integer $gt $gte $lt $lte $in | 0: Invalid (do not use in requirements) 1: Platform 2: TestFlight 3: Development 4: App Store 5: Enterprise (UPP or Adhoc distribution) 6: Developer ID 7: Local Signing (for Swift Playgrounds) 8: Rosetta (AOT signing) 9: OOPJIT 10: None (adhoc or self signed) | You can construct a requirement that uses $gt, $gte, $lt, or $lte but Validation Categories aren't meaningfully ordered so you should only use the exact category you want or the $in operator. |

411 — internal
412 — entitlements
413 — in-tc-with-constraint-category
414 — is-init-proc
415 — is-sip-protected
416 — launch-type
417 — on-authorize-authapfs-volume
418 — on-system-volume
419 — signing-identifier
420 — sip-enabled
421 — team-identifier
422 — validation-category

| Operator Keys | Value Type | Refers to a Fact | Notes |
|---|---|---|---|
| $and | Dictionary | No | Expects a dictionary of facts or operations. This operator returns a match if all included facts are matched and all include operations return true. |
| $gt | Integer | Yes | Returns true if the system value of the left hand side fact is greater than the supplied integer |
| $gte | Integer | Yes | Returns true if the system value of the left hand side fact is greater than or equal to the supplied integer |
| $in | Array | Yes | The array must be an an array of strings or an array of integers. Returns true if the system value of the fact matches any of the items in the array. |
| $lt | Integer | Yes | Returns true if the system value of the left hand side fact is less than the supplied integer |
| $lte | Integer | Yes | Returns true if the system value of the left hand side fact is less than or equal to the supplied integer |
| $optional | Dictionary | No | This dictionary should only include one fact-value or operation-value pair.<br><br>This operator returns true if the fact is matched, if the operator returns true, or if the fact or operator are unknown to this OS version. |
| $or | Dictionary | No | Expects a dictionary of fact or operations. This operator returns a match if any included fact is matched or any included operation returns true. |
| $query | Array | Yes | See Entitlements Query Array |

431 — $and
432 — $gt
433 — $gte
434 — $in
435 — $lt
436 — $lte
437 — $optional
438 — $or
439 — $query

| Operation | OpCode | Value | Notes |
|---|---|---|---|
| SelectKey | 1 | String | An entitlement name. |
| SelectIndex | 2 | Integer | An index into an array in the entitlements dictionary |
| SelectKeyWithPrefix | 9 | String | A string prefix for an entitlement key. This matches longest entitlement key with this prefix. |

FIG. 4D

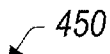

| Operation | OpCode | Value | Notes |
|---|---|---|---|
| MatchString | 3 | String | Matches an exact string value. |
| MatchStringPrefix | 4 | String | Matches a string prefix value |
| MatchBool | 5 | Boolean | Matches a boolean value |
| MatchStringValueAllowed | 6 | String | Matches an individual string or checks for the presence of that string in an array. |
| MatchInteger | 7 | Integer | Matches an exact integer |
| StringPrefixValueAllowed | 8 | String | Matches a string prefix or checks for a match against the string prefix in an array |
| IntegerValueAllowed | 10 | Integer | Matches an integer or checks an array for a match. |
| MatchType | 11 | Integer | Enumeration for types: 1 - Dictionary 2 - Sequence (array) 3 - Integer 4 - String 5 - Boolean |

*FIG. 4E*

Figure 4F:
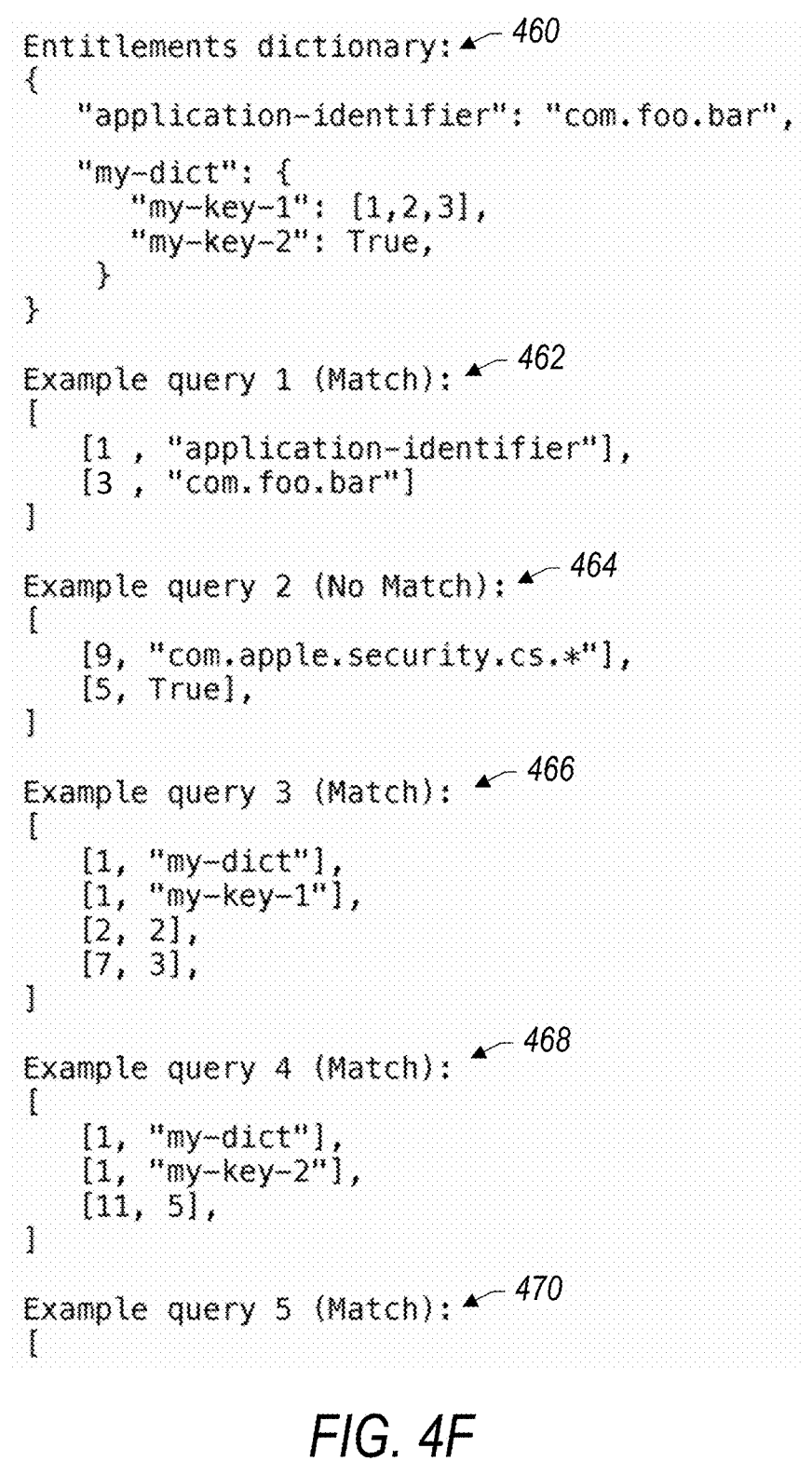

```
Entitlements dictionary: ←— 460
{
    "application-identifier": "com.foo.bar", "my-dict": {
        "my-key-1": [1,2,3],
        "my-key-2": True,
    }
}

Example query 1 (Match): ←— 462
[
    [1 , "application-identifier"],
    [3 , "com.foo.bar"]
]

Example query 2 (No Match): ←— 464
[
    [9, "com.apple.security.cs.*"],
    [5, True],
]

Example query 3 (Match): ←— 466
[
    [1, "my-dict"],
    [1, "my-key-1"],
    [2, 2],
    [7, 3],
]

Example query 4 (Match): ←— 468
[
    [1, "my-dict"],
    [1, "my-key-2"],
    [11, 5],
]

Example query 5 (Match): ←— 470
[
```

| Option | Description |
|---|---|
| --launch-constraint-self | A path to a plist representation of a Requirements Dictionary indicating the desired constraint on this binary |
| --launch-constraint-parent | A path to a plist representation of a Requirements Dictionary indicating the desired constraint on the parent of this binary |
| --launch-constraint-responsible | A path to a plist representation of a Requirements Dictionary indicating the desired constraint on the responsible process for this binary |
| --constraint-category | A number indicating the desired constraint category to assign to this binary. Constraint categories are added to the full Light weight code requirement for the binary itself |

*FIG. 4G*

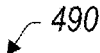

490

```
Example codesign -d -vvvv ls_lwcr
Executable=/Users/local/Downloads/ls_lwcr
Identifier=ls_lwcr-555549446b5ecd0691503c0b9bb12a11e2a16987
Format=Mach-O universal (x86_64 arm64e)
CodeDirectory v=20400 size=969 flags=0x2(adhoc) hashes=18+8 location=embedded
VersionPlatform=1
VersionMin=720896
VersionSDK=851968
Hash type=sha256 size=32
CandidateCDHash sha256=70d4e9229eacd716a1208f7489ee06d9b7b576fa
CandidateCDHashFull sha256=70d4e9229eacd716a1208f7489ee06d9b7b576fadb1dcf1e9a0c5b44b93b4e15
Hash choices=sha256
CMSDigest=70d4e9229eacd716a1208f7489ee06d9b7b576fadb1dcf1e9a0c5b44b93b4e15
CMSDigestType=2
Executable Segment base=0
Executable Segment limit=32768
Executable Segment flags=0x1
Page size=4096
Launch Constraints:
        Has Self Launch Constraints
        [Dict]
                [Key] ccat
                [Value]
                        [Int] 0
                [Key] comp
                [Value]
                        [Int] 1
                [Key] reqs
                [Value]
                        [Dict]
                                [Key] $or
                                [Value]
                                        [Dict]
                                                [Key] on-authorized-authapfs-volume
                                                [Value]
                                                        [Bool] true
                                                [Key] on-system-volume
                                                [Value]
                                                        [Bool] true
                                [Key] launch-type
                                [Value]
                                        [Int] 1
                                [Key] validation-category
                                [Value]
                                        [Int] 1
                [Key] vers
                [Value]
                        [Int] 1
CDHash=70d4e9229eacd716a1208f7489ee06d9b7b576fa
Signature=adhoc
Info.plist=not bound
TeamIdentifier=not set
Sealed Resources=none
Internal requirements count=0 size=12
```

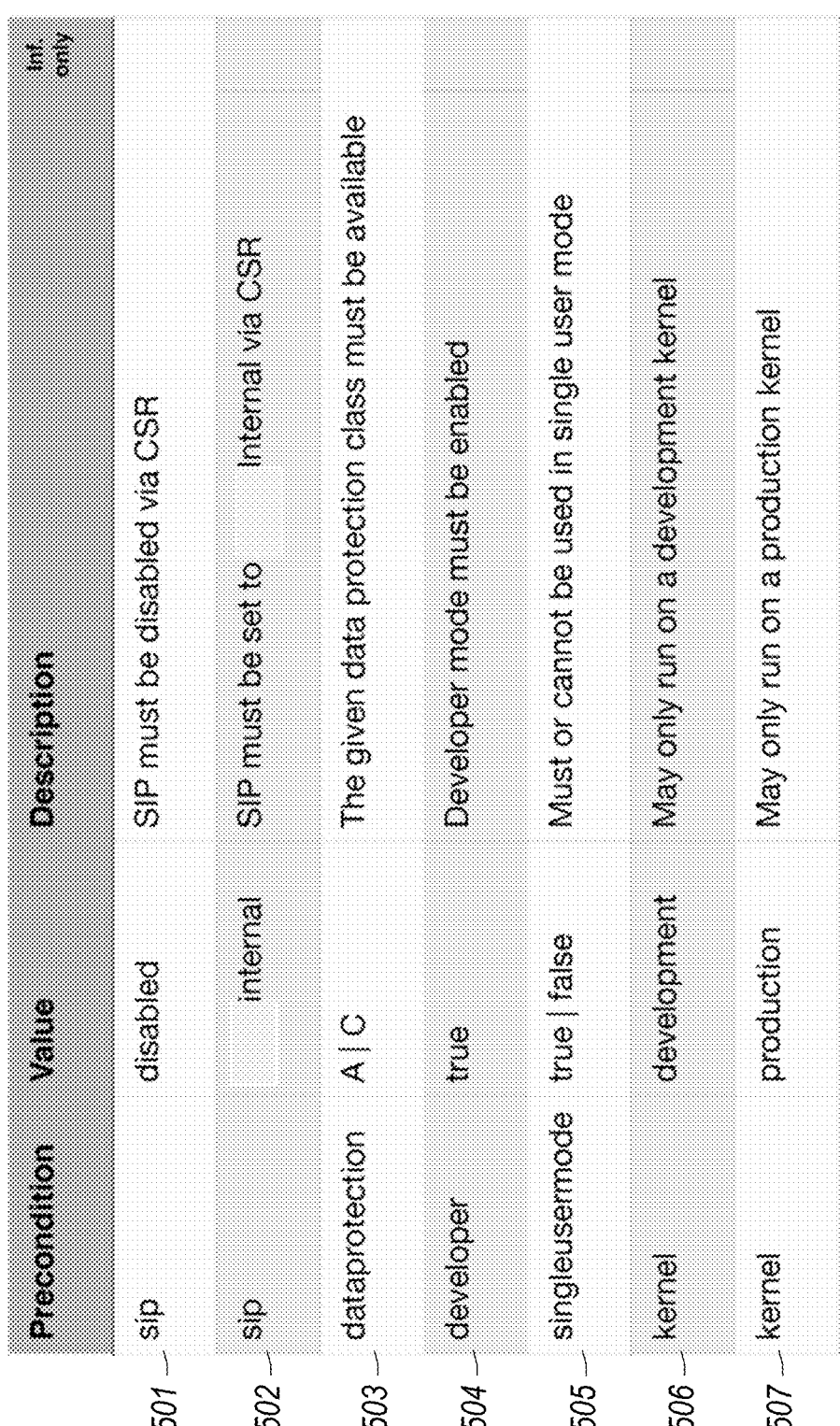

500

| Precondition | Value | Description | Int only |
|---|---|---|---|
| sip | disabled | SIP must be disabled via CSR | |
| sip | internal | SIP must be set to Internal via CSR | |
| dataprotection | A \| C | The given data protection class must be available | |
| developer | true | Developer mode must be enabled | |
| singleusermode | true \| false | Must or cannot be used in single user mode | |
| kernel | development | May only run on a development kernel | |
| kernel | production | May only run on a production kernel | |

501 — sip
502 — sip
503 — dataprotection
504 — developer
505 — singleusermode
506 — kernel
507 — kernel

| Matching on the context of invocation — Prefix: "context." | | | |
|---|---|---|---|
| Precondition | Value | Description | Int. only |
| 511 — launchmode | daemon | Launched by launchd as a LaunchDaemon | |
| 512 — launchmode | agent | Launched by launchd as a LaunchAgent | |
| 513 — launchmode | xpc | Launched by launchd as an XPC service | |
| 514 — launchmode | appex | Launched by launchd as an app extension | |
| 515 — launchmode | app | Launched by user as an app | |
| 516 — launchmode | launchdspawn | Spawned via launchd | |
| 517 — launchmode | lockdown | Parent must be lockdownd, spawning as service | |
| 518 — launchmode | exec | Launched via exec | |
| 519 — launchmode | spawn | Launched via posixspawn (not indirectly by launchd) | |
| 520 — launchdomain | system | Launched by launchd, installed in /System | |
| 521 — launchdomain | library | Launched by launchd, installed in /Library | |
| 522 — launchdomain | user | Launched by launchd, installed in ~/Library | |
| 523 — launchdomain | application | Launched by launchd, XPC service or app extension embedded in app | |
| 524 — joblabel | "label" | Must be launched by launchd as an instance of the given job label (identifier) | |
| 525 — usersession | false | Not allowed in user audit session | |
| 526 — rlimits | true \| false | Must or cannot be executed with rlimits | |
| 527 — bootstrap | trusted | The bootstrap port must be a legitimate bootstrap port serviced by the bootstrap server (launchd). | |
| 528 — interpreter | true \| false | Must or cannot be executed as a #! interpreter | |

FIG. 5B

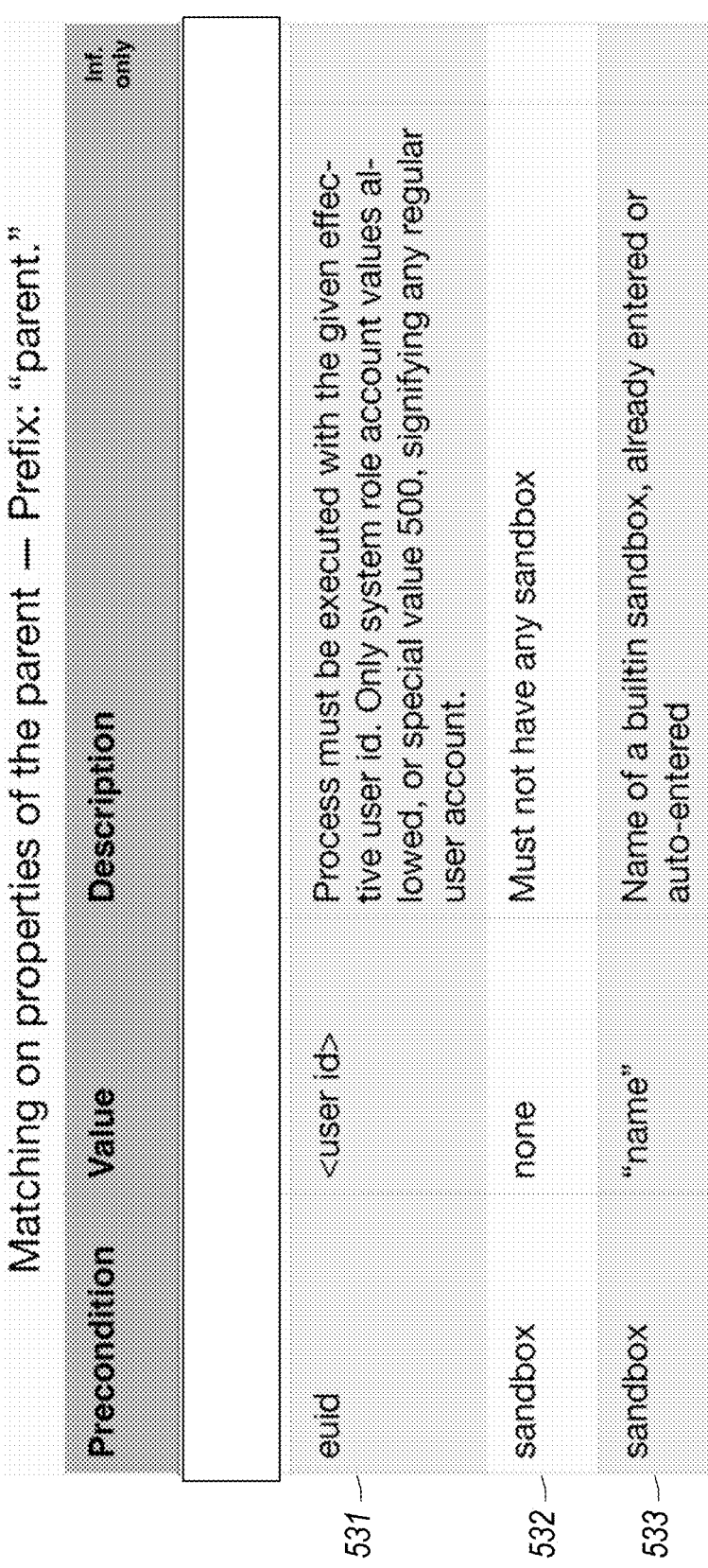

_530_

Matching on properties of the parent — Prefix: "parent."

| Precondition | Value | Description | Int. only |
|---|---|---|---|
| euid | <user id> | Process must be executed with the given effective user id. Only system role account values allowed, or special value 500, signifying any regular user account. | |
| sandbox | none | Must not have any sandbox | |
| sandbox | "name" | Name of a builtin sandbox, already entered or auto-entered | |

531 — euid
532 — sandbox
533 — sandbox

_FIG. 5C_

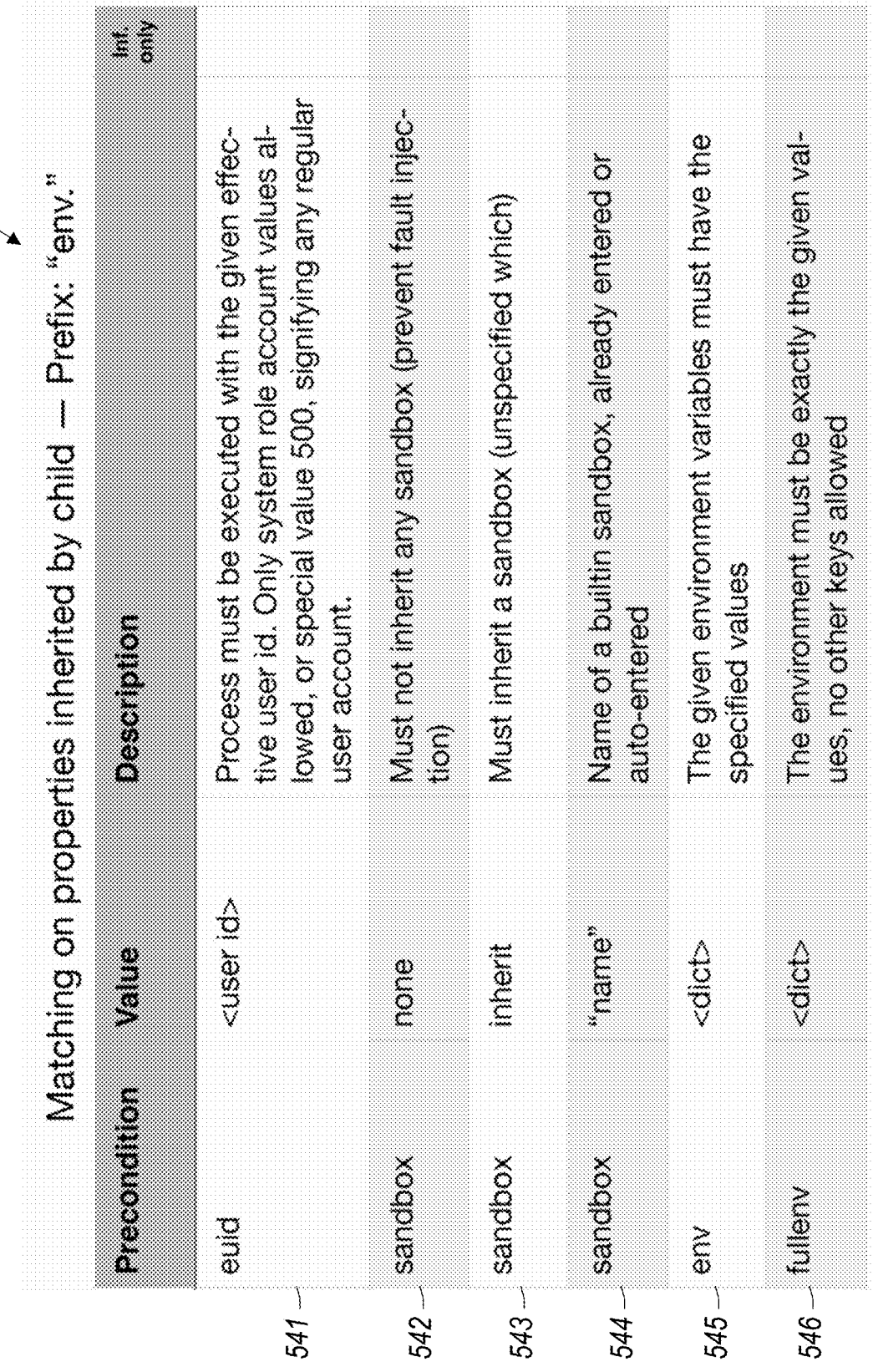

Matching on properties inherited by child — Prefix: "env."

| Precondition | Value | Description | Int only |
|---|---|---|---|
| euid | \<user id\> | Process must be executed with the given effective user id. Only system role account values allowed, or special value 500, signifying any regular user account. | |
| sandbox | none | Must not inherit any sandbox (prevent fault injection) | |
| sandbox | inherit | Must inherit a sandbox (unspecified which) | |
| sandbox | "name" | Name of a builtin sandbox, already entered or auto-entered | |
| env | \<dict\> | The given environment variables must have the specified values | |
| fullenv | \<dict\> | The environment must be exactly the given values, no other keys allowed | |

541 — euid
542 — sandbox
543 — sandbox
544 — sandbox
545 — env
546 — fullenv

Modifying the environment inherited by child — Prefix: "modenv."

550

| Precondition | Value | Description | Inf. only |
|---|---|---|---|
| fixenv | <dict> | Set environment to the given values, eliminate other keys | |
| unsetenv | <array> | Environment variables that must not be set | |

551

552

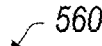

560

Matching on the properties of the new process — Prefix: "child."

| Precondition | Value | Description | Int only |
|---|---|---|---|
| setuid | true \| false | Must or must not be setuid | |
| setgid | true \| false | Must or must not be setgid | |
| execpath | <path> | Must be executed from the given path | |
| argv0 | execpath | argv[0] must be equal to execpath | |
| argc | <number> | argc must be equal to this number | |
| siptrusted | true | Executable must be SIP trusted | |
| systempartition | true | Executable must reside on the read-only system partition | |
| platformexe | true \| false | Must or must not be a platform executable | |
| locker | true | Must be part of a sealed bundle (OctetShadow) | |
| posix | <uid>:<gid>:<rwxrwxrwx> | Must have the specified POSIX permissions | |
| pid | 1 | Only runs as pid1 (i.e. launchd) | |
| restricted | true | The executable must be CS_RESTRICTED | |
| lv | true | The executable must be subject to Library Validation | |
| scripttrusted | true \| false | The script file passed to interpreter (if any) must or must not be SIP trusted | |
| inheritedsip | true \| false | Process has or has not inherited SIP privilege | |
| childprecond | true \| false | Parent process must or must not have passed in a child precondition | |
| csidentifier | "identifier" | Must have the specified code signing identifier | • |
| cdhash | "cdhash" | Must have the specified code directory hash | • |
| codereq | <code req> | The new executable must satisfy the specified code requirement | |

*561* — setuid
*562* — setgid
*563* — execpath
*564* — argv0
*565* — argc
*566* — siptrusted
*567* — systempartition
*568* — platformexe
*569* — locker
*570* — posix
*572* — restricted
*573* — lv
*574* — scripttrusted
*575* — inheritedsip
*576* — childprecond
*580* — csidentifier
*581* — cdhash
*582* — codereq

FIG. 5F

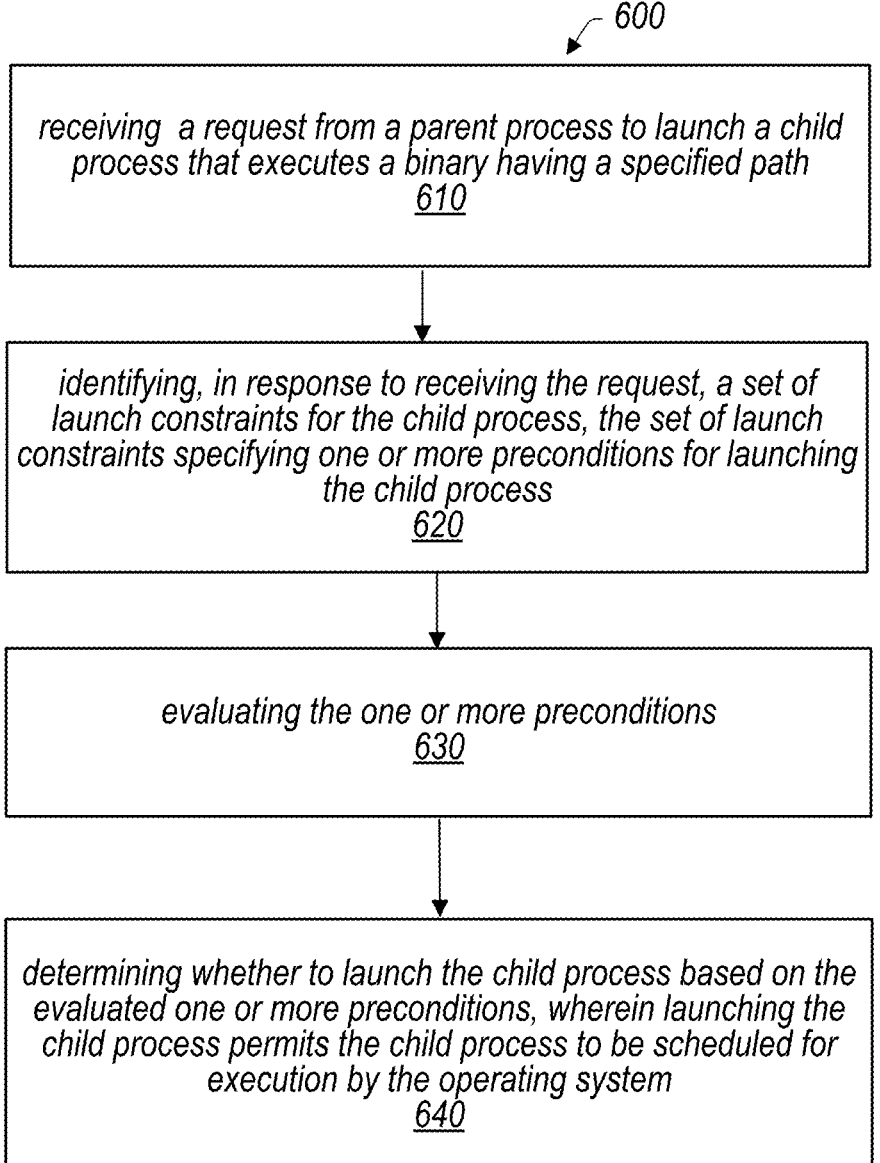

*600* receiving a request from a parent process to launch a child process that executes a binary having a specified path
*610* identifying, in response to receiving the request, a set of launch constraints for the child process, the set of launch constraints specifying one or more preconditions for launching the child process
*620* evaluating the one or more preconditions
*630* determining whether to launch the child process based on the evaluated one or more preconditions, wherein launching the child process permits the child process to be scheduled for execution by the operating system
*640*

*FIG. 6*

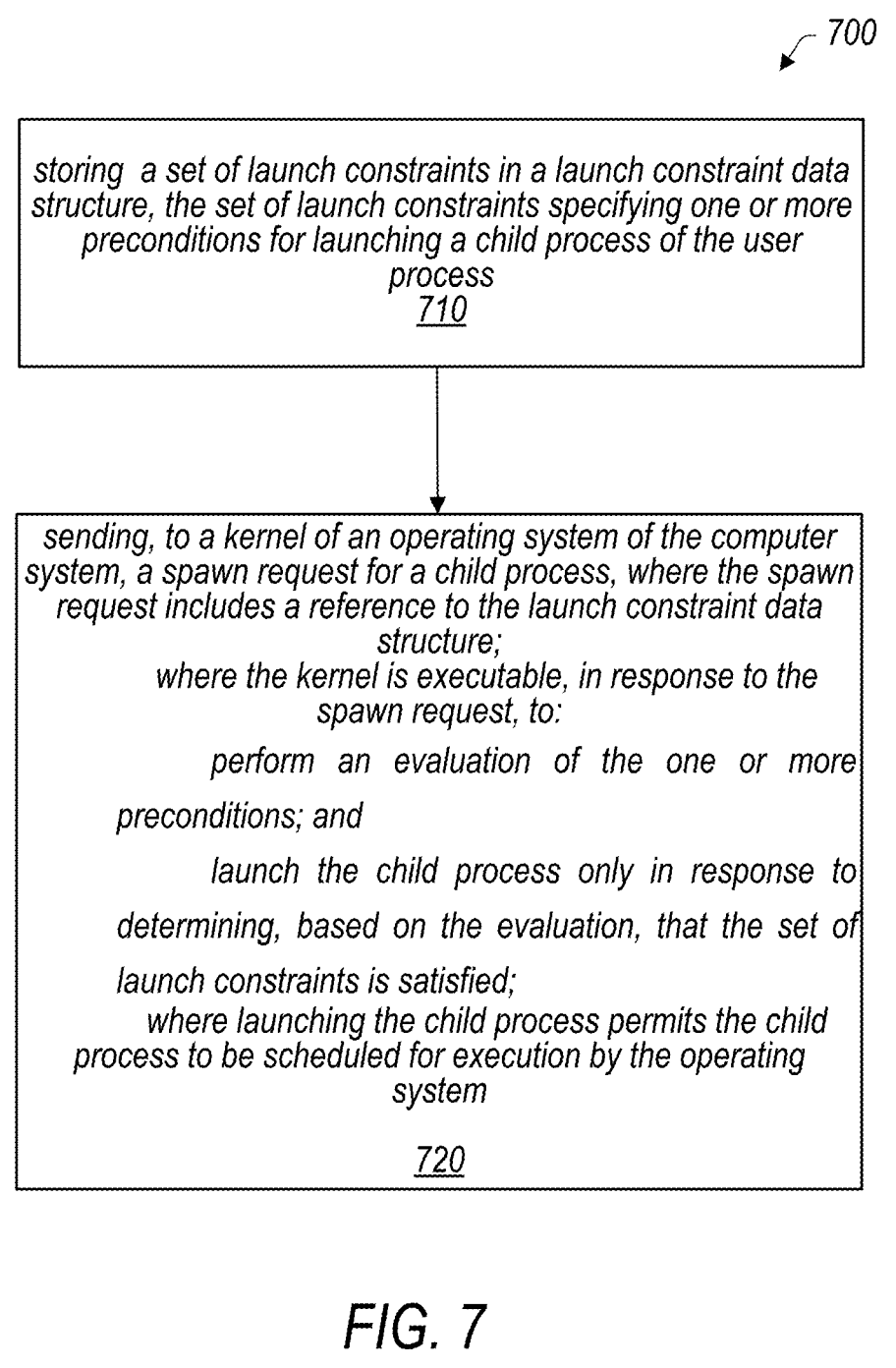

700 storing a set of launch constraints in a launch constraint data structure, the set of launch constraints specifying one or more preconditions for launching a child process of the user process
710 sending, to a kernel of an operating system of the computer system, a spawn request for a child process, where the spawn request includes a reference to the launch constraint data structure;
where the kernel is executable, in response to the spawn request, to:

perform an evaluation of the one or more preconditions; and launch the child process only in response to determining, based on the evaluation, that the set of launch constraints is satisfied;
where launching the child process permits the child process to be scheduled for execution by the operating system
720

*FIG. 7*

PROCESS LAUNCH CONSTRAINTS

PRIORITY CLAIM

The present application claims priority to U.S. Provisional Application No. 63/365,868, entitled "Process Launch Constraints," filed Jun. 5, 2022, the disclosure of which is incorporated by reference herein in its entirety.

BACKGROUND

Technical Field

This disclosure relates generally to computer system processes, and, more specifically, to imposing fine-grained launch constraints on such processes.

Description of the Related Art

Operating system processes are greatly influenced by the environment in which they run. An environment includes a host of global system factors, including the contents of the filesystem and NVRAM variables, but also includes factors inherited from the parent process in a hierarchical fashion. Inherited environment can include environment variables, command line arguments, open file descriptors, working directory, chroot jail, process limits, user credentials, a variety of kernel ports, and the process sandbox.

Where certain conventional operating systems may have relatively simple process models based, for example, on fork and exec calls, certain modern operating systems have a number of highly specialized executable types. Accordingly, executables sometimes have one and only one intended client or parent. Examples include apps, XPC services, app extensions, and launched (launch daemon) jobs. As such, certain processes may be intended to run only in a particular setting—for example, in the background and initiated by a particular system daemon.

BRIEF DESCRIPTION OF THE DRAWINGS

FIGS. 4A-4H are tables illustrating different aspects of an example language for specifying launch constraints.

FIGS. 5A-F are tables listing further examples of different launch constraints.

FIG. 6 is a flow diagram of one embodiment of a method for implementing launch constraints.

FIG. 7 is a flowchart of one embodiment of a method for spawning a process with launch constraints.

DETAILED DESCRIPTION

Figure 1:
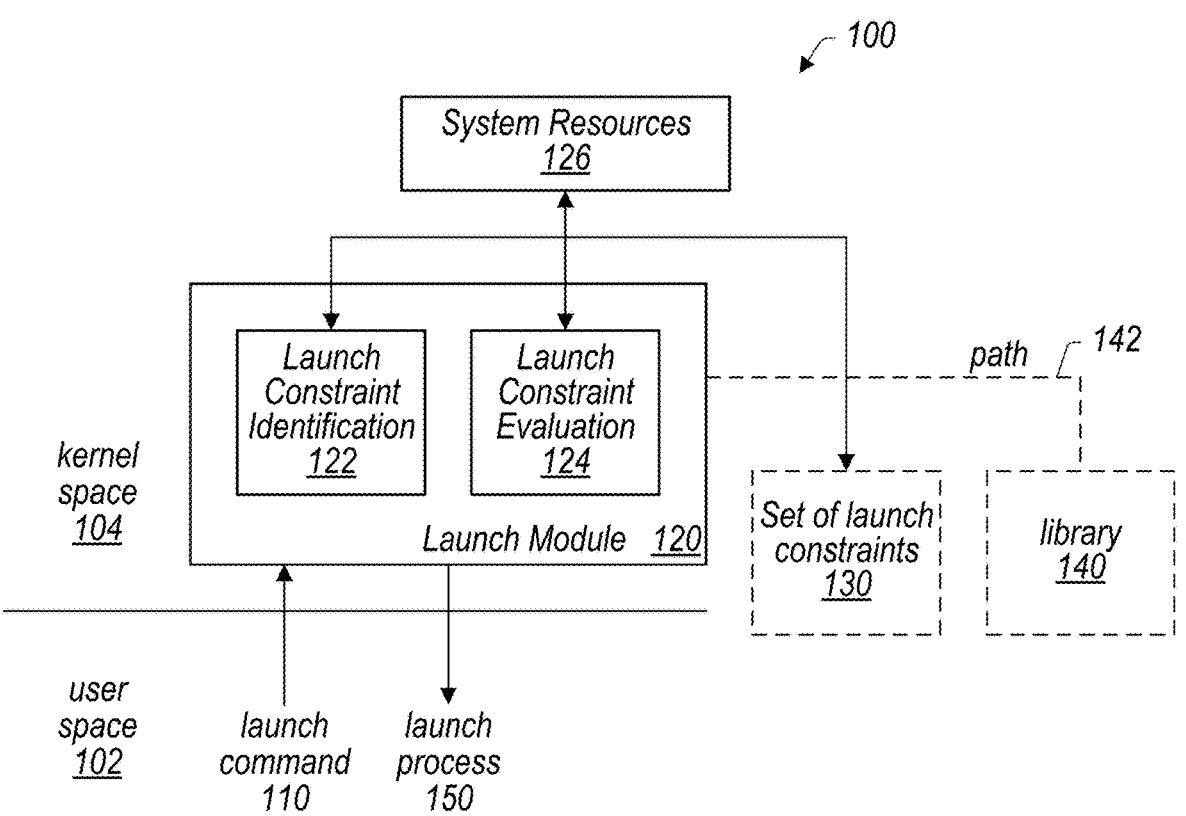
FIG. 1 is a block diagram illustrating the use of launch constraints within a kernel of an operating system.

When a parent process asks a computer operating system to create a child process, the parent process provides a set of information that can be referred to as the child process's "launch environment." A launch environment commonly includes information such as command line arguments, environment variables, file descriptors (e.g., stdin, stdout, stderr), initial posix permissions (user id, group id, session id, etc.), and may include, in certain operating systems, various ports (e.g., exception ports, boot strap ports, special ports), as well as other types of information. This launch environment can impact how the child process behaves, including by identifying the source of the child process's input. Once the child process starts, it utilizes this environment information during execution.

One type of computer security attack involves the launch of a process in an unexpected manner. One concern is that a child process's launch environment might be manipulated by an attacker in such a way to cause the child process to read data from some place it ordinarily would not read from, or to behave in an unexpected way. Thus, a corrupted launch environment can lead to computer security issues.

A related type of security attack involves privilege escalation. In a system in which processes gain privilege depending on the executable from which they were created, an attacker's goal is often to take control over a process that has a certain privilege. One form of privilege escalation involves a parent process co-opting a child process. Thus, a first, low-level process can cause a second process that has some greater set of privileges to execute, and then exploit those privileges to some unauthorized end. For example, if a particular background process that is intended to be run only on an integrity-protected system volume can actually be copied to an unprotected data volume, an attacker may be able to cause additional libraries to be loaded into that process to gain unauthorized privileges.

Similarly, a child process can co-opt a parent process. For example, suppose that process A wishes to launch process B, where process B will inherit properties from process A. The call to actually cause that launch includes specifying a path for process B—that is, specifying a location of the binary for process B. But when the location at the specified path is not adequately protected on disk, this can lead to a race condition in which a malicious user can switch out the binary for expected process B with the binary for, say, process C. In this manner, unauthorized process C, rather than B, is launched, and thus inherits the properties of process A.

The difficulty in enumerating and sanitizing or validating all implicitly inherited environment elements is the root cause of many vulnerabilities with respect to executables. The attack surface begins before the first program instruction is executed (e.g., in main( )), during initialization. A process may attempt to clean its environment as soon as main( ) is called, but library state may at that point have already been initialized based on the untrusted environment. Furthermore, crucial environmental information may become unavailable once main( ) is called—for example, the parent process may have terminated, making it impossible for the child to know whether it was executed by a trusted parent.

This disclosure describes a way to impose fine-grained launch constraints on processes, thus avoiding or ameliorating the above-described problems. As used herein, the "launch" of a process in a computer system refers to performing a command that permits code for the process to be scheduled and run by an operating system. Different commands that perform a launch operation exist in different operating systems. Two well-known paradigms for launching a process in UNIX-like systems are fork/exec and spawn. As used herein, a "launch operation" includes: 1) receiving, in the kernel, a system call from a parent process to launch a child process, 2) the kernel creating and setting up the new process, and 3) the kernel transferring execution from kernel space back to user space in the new process; a "launch operation," as used herein, does not include any execution of code in user space in the new process (and thus excludes, for example, processing of the environment or loading of libraries).

Existing launch commands can have various arguments (e.g., a path to the binary to be launched). In one sense, the proposed launch constraints can be considered to be an additional argument for the launch command, but, as will be described, the launch constraints do not have to be included in the launch command itself. In some cases, launch constraints can be embedded in the binary. As will be described, a detailed language can be used to specify a robust set of constraints. In response to receiving a launch command, an operating system according to the present disclosure will identify any launch constraints, evaluate them, and then perform the launch only if the launch constraints are satisfied.

Traditionally, a launch command or operation can fail for a variety of reasons including, but not limited to: 1) the path provided does not exist, 2) the parent process does not have permission to access or execute the path, 3) the file at the specified path does not have the executable permission, 4) the file at the specified path is not in a format that the kernel knows how to execute, and 5) the computer system does not have current capacity to execute the process. These are all global causes for failure that are common to all processes launched by a given operating system. Unlike these global launch requirements, which are already included in operating system kernels, the launch constraints described in the present disclosure are specific, meaning that specific launch constraints can now be set on specific processes while not constraining others. This approach confers the ability to be more precise about what conditions are and are not allowed with respect to the launch of a particular process.

As opposed to the existing approach for launch commands, in which a launch command will cause a process to launch absent a failure of one or more of a set of global launch requirements, in the proposed paradigm, a launch command can be made to conditionally execute based on constraints that are identified as part the launch operation. (There is no need to "identify" global launch requirements since these are common to all process launches. That is, in current operating systems it is not optional to waive global launch requirements. For example, it is not possible for a parent process to make a request to launch a child process, but to go ahead even if the specified binary is not located at the designated path. This type of a check is performed for all processes, and failing these requirements causes a process not to launch.) Under the proposed paradigm, global launch requirements are still evaluated, but additional launch constraints are identified and then evaluated. These constraints may be identified by searching the binary to be launched, or receiving the constraints via the launch command, etc. The launch constraints, once identified, operate as an additional set of one or more preconditions for performing the launch. Unlike global launch constraints, however, this additional set of preconditions does not constrain all process launches within the system.

Consider a traditional launch command argument that specifies that binary A should be run from path P. As noted above, the launch command will fail for example, if binary A does not exist at path P. But this "invalid path" failure does not constitute a launch constraint that is identified during execution of the launch command. Instead, the requirement that the specified binary have a valid path is a condition that is built into the launch software of the operating system and pertains to all processes system-wide. The present disclosure is concerned with launch constraints that can be set selectively, allowing parent processes to set constraints on child processes in certain cases, and allowing child processes to set constraints on parent processes. Accordingly, the operating system launch operation will "identify" these selectively specified constraints when a launch command is received, and then evaluate the preconditions specified by these constraints (in addition to whatever global launch requirements the operating system has).

The use of launch constraints can also be referred to as executable cross-validation, which is based on the principle that privileged entities (processes) should be able to control the entities that interact with them. The present disclosure explains that an executable can statically declare a set of environmental predicates that need to be satisfied before the first instruction of the process is allowed to execute. This approach permits an executable with a very narrow intended use and potentially powerful privileges to reduce its attack surface to only intended use cases. In this manner, a child process can prevent being manipulated by a parent process. The present disclosure also supports child preconditions that prevent spawning an executable unless a certain set of requirements are satisfied. This is done in a manner that is not subject to race conditions. This approach thus supplements the benefits of code signing, which provides functionality to identify both executables and processes that have been tampered with, and thus permits a parent process to prevent manipulation by a child process.

FIG. 1 depicts a block diagram 100 that illustrates the launch constraint paradigm. As shown, a launch module 120 exists in a kernel space 104 within a computer operating system that is distinct from a user space 102. System resources 126 refers to any resource within the computer system that can be evaluated by launch module 120. One example of a system resource 126 is the memory that specifies the volume on which the child process is located.

In the illustrated embodiment, launch module 120 receives a launch command 110, which is a request to launch a particular binary 140 that is located in a location specified by a path 142. In some cases, binary 140 is a system file (i.e., is part of the operating system or related files). In other cases, however, binary 140 can be a third-party application that executes on the computer operating system.

As noted, examples of UNIX-style launch commands include the exec family of system calls (which can be made following a fork call) and spawn calls (e.g., via the posix_spawn interface). As is known, a UNIX fork command creates a new process that causes the child process to inherit the parent process's address space. A fork command is commonly followed with an exec call that causes a new program to begin executing inside the child process. Accordingly, when it is desired to begin execution of binary 140, a fork command in a parent process can be followed by an exec call that specifies binary 140 via path 142. In such a case, the code within kernel space 104 that performs the relevant exec command can be said to constitute launch module 120 in some embodiments.

After receiving a request to launch a process to execute a binary having a specified path, launch constraint identification sub-module 122 identifies a launch constraint 130 for the process. As will be described, the identification of launch constraint 130 may occur in several ways. First, the launch constraint may be embedded in the binary. Second, launch constraint 130 may be specified in the launch command itself. Finally, launch constraint 130 may be located in some other location available to the operating system (e.g., a trust cache in kernel space). Given this variability in location, launch constraint 130 is indicated with a dotted line in FIG. 1.

The identification of launch constraint 130 includes determining what actions need to be performed in order to evaluate the launch constraint. This may involve interpreting a series of expressions that make up launch constraint 130. Launch constraint 130 can thus include multiple sub-constraints, which may be evaluated, for example, according to a series of Boolean operators. Examples of multiple constraints are described further below.

Next, launch constraint evaluation submodule 124 evaluates launch constraint 130 by interrogating some system resource 126, which constitutes any queryable piece of information in the computer system. Because there is a wide array of possible launch constraints, the identity of system resource 126 is similarly broad. For example, launch constraint 130 might specify that a particular process is not to be launched unless it is being launched from the system volume (as opposed to a data volume, say). The corresponding system resource 126 would constitute the volume of the process to be launched.

Finally, based on the evaluation, launch module 120 determines whether to go forward with the launch based on the results of the evaluating. In the example in the preceding paragraph, the launch command will not be performed if the particular process is attempting to be launched from a data volume as opposed to a system volume. In this manner, launch restrictions can be imposed on a parent process (e.g., by embedding the launch restrictions in the binary in question) or a child process (e.g., by including the launch restrictions in the launch command).

As noted, there are various ways that launch constraints can be communicated to launch module 120. As depicted in block diagram 200 of FIG. 2A, binary 140 can include an embedded launch constraint 130, as well as a digital signature 242. As is known, signature 242 can be generated by hashing the binary and encrypting the hash using a private key. Signature 242 can be verified by launch module 120 in reverse fashion: module 120 can generate its own hash of binary 140, and then decrypt signature 242 using the corresponding public key. If the two hashes match, the binary (and thus launch constraint 130) have not been modified, and therefore can be trusted.

Figure 2A:
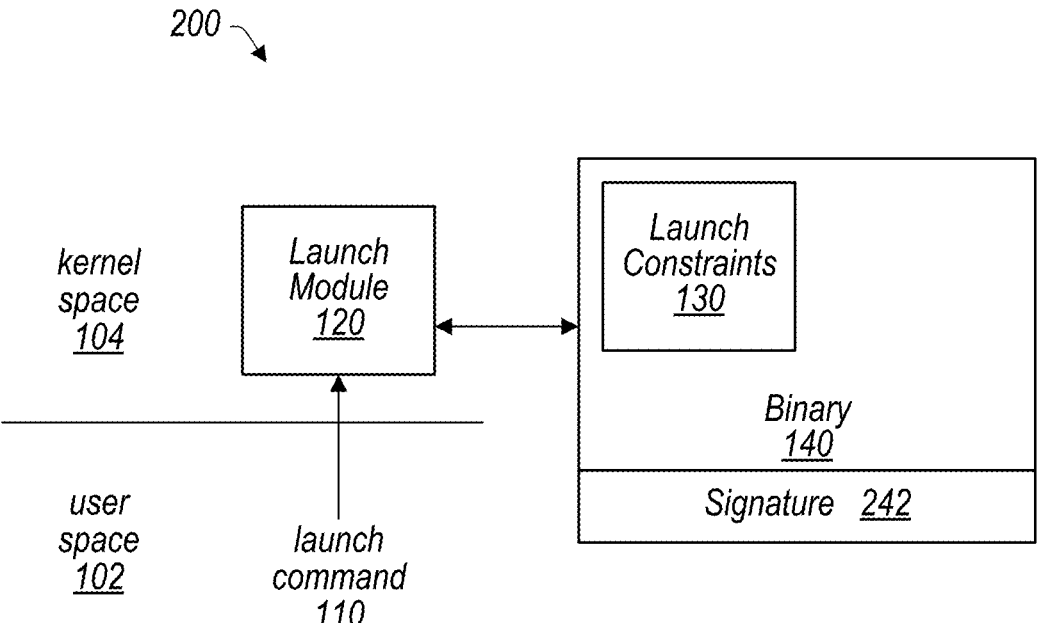
FIG. 2A is a block diagram illustrating an example of launch constraints included within a binary to be executed.
Figure 2B:
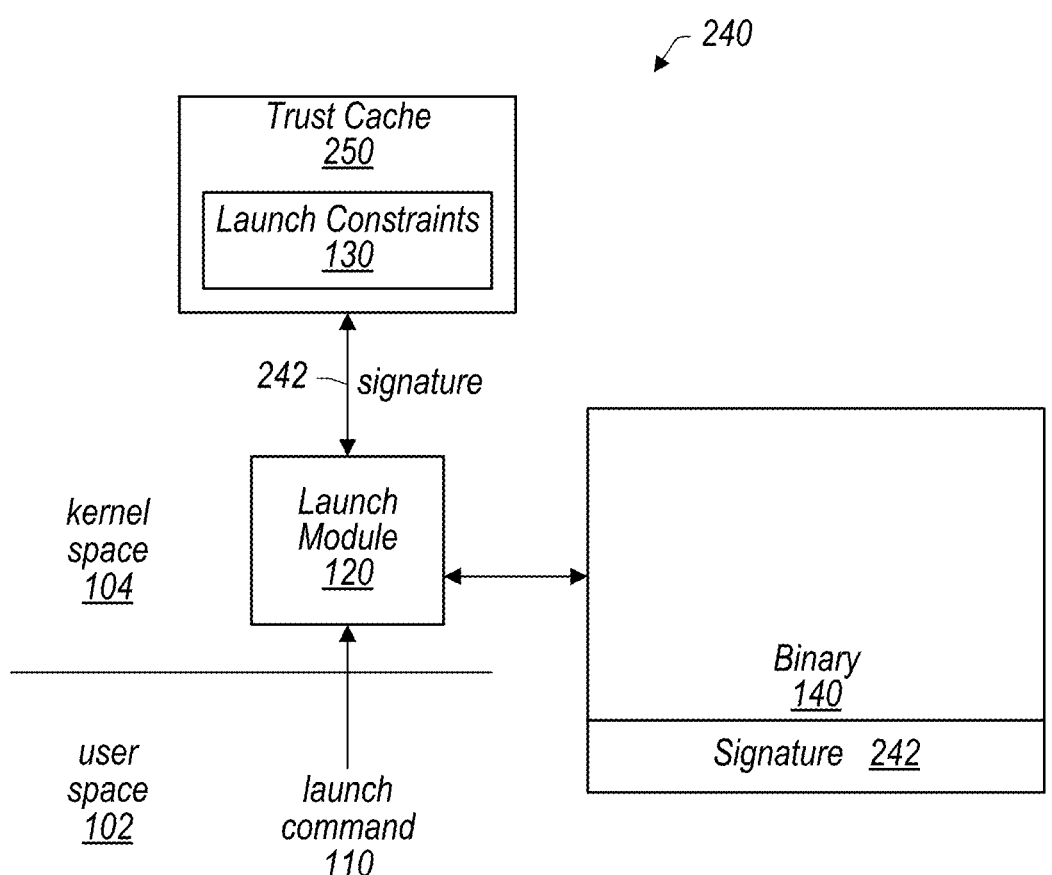
FIG. 2B is a block diagram illustrating an example of launch constraints included within a trust cache within a kernel space of a computer operating system.

A related paradigm is shown in block diagram 240 in FIG. 2B. As with the paradigm described with respect to FIG. 2A, launch module 120 can verify signature 242 of binary 140. Signature 242 can then be used to retrieve launch constraint 130 from a trust cache 250. A trust cache is block of signed data that can be cryptographically verified, and which indicates a set of things (e.g., a set of binaries) that should all be trusted together. Trust cache 250 is commonly located in memory in kernel space 104, such that there is no question of a security problem relating to its contents. Once launch constraint 130 is retrieved from trust cache 250, it can be evaluated and then binary 140 can be launched if appropriate.

The approaches of FIGS. 2A-B both allow a child process (i.e., one based on executing binary 140) to enforce launch constraints on an invoking parent process. In other words, no matter what parent process attempts to launch a process that will execute binary 140, launch constraint 130 can be enforced. The paradigm of FIG. 2A allows launch constraints to be imposed very specifically on individual binaries, while the paradigm of FIG. 2B allows launch constraints to be imposed on large swaths of the operating system at a time.

Figure 2C:
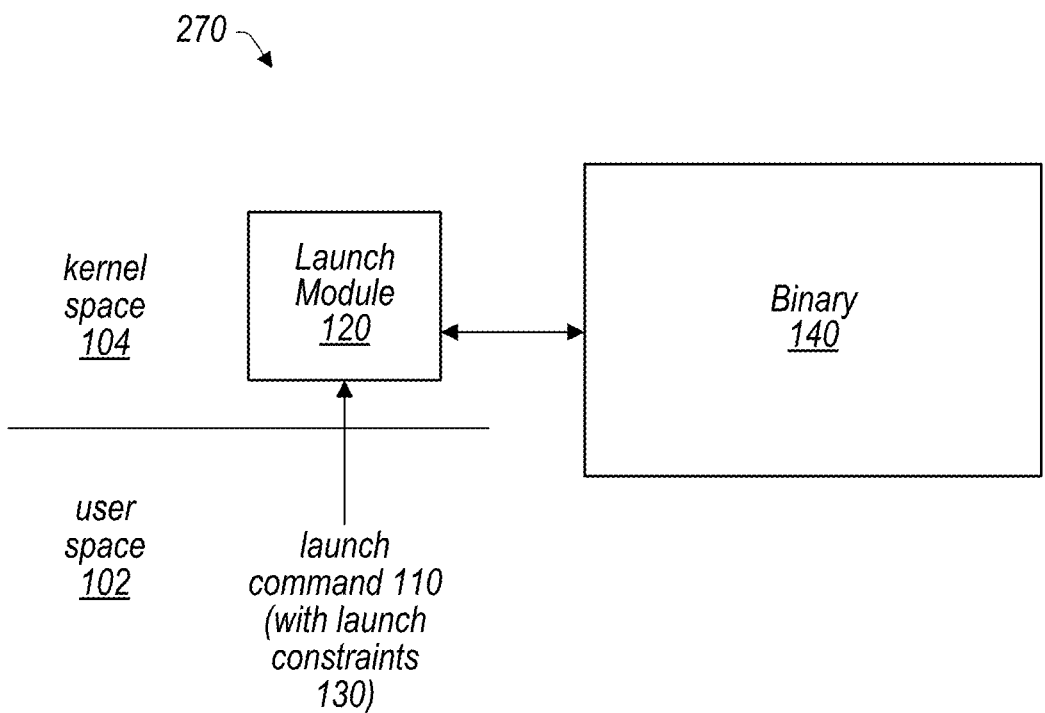
FIG. 2C is a block diagram illustrating an example of launch constraints included within a launch command.

In contrast, block diagram 270 of FIG. 2C illustrates how a parent process can impose launch constraints on a child process. In this paradigm, launch command 110 includes launch constraint 130 as one of the arguments of the command itself. This prevents a scenario in which binary 140 is specified to be launched, and then a different binary with different properties is attempted to be substituted for binary 140. One means of implementing this approach is through the posix_spawn interface. Unlike the fork/exec paradigm, posix_spawn creates, or spawns, a new process without copying the address space or destroying the current process. Non-UNIX operating systems such as WINDOWS also use this style of process creation. Thus, a parent process spawning a child process can pass in a set of launch constraints using a new function—e.g., posix_spawnattr-_setchildpreconditions_np(posix_spawnattr_t *attr, void *data, size_t data_len), where posix_spawnattr_t is a variable of type attr that stores a set of launch constraints.

Figure 3:
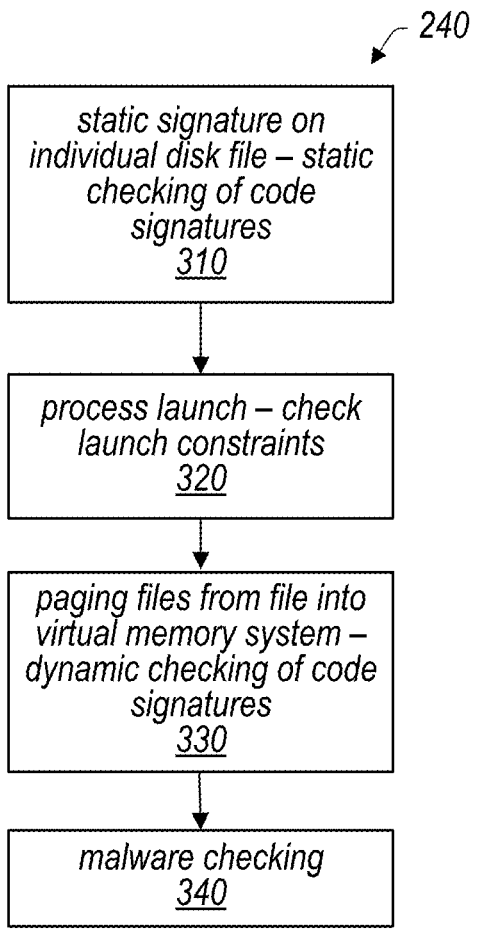
FIG. 3 is a block diagram illustrating differences between code signing and launch constraints.

FIG. 3 is a flow diagram 300 that clarifies the difference between code signing on one hand and a launch operation that identifies and evaluates launch constraints on the other. In some embodiments, the signature of a file on disk can be evaluated cryptographically to determine whether it matches the data on disk. This process may be referred to as a static code signature check, and is indicated at 310. This type of check is prone to race conditions because there is a time differential between when data on disk is evaluated and when it might later be used. If this check passes, the operating system may begin mapping data from the file into a process space in active memory so that it can subsequently execute. If this check fails, this file will not be eligible for execution. Notably, however, static code signing is not performed in the context of an attempt to actually launch a process, and thus, by itself, does not constitute a process launch constraint within the meaning of the present disclosure.

Process launch is indicated at 320. In this step, code of the process is loaded into a process space such that it can be scheduled and run by the operating system. As noted, launch can correspond to an exec or posix_spawn system call, their equivalents, etc. Dynamic use of code signatures occurs during this process (and during library load). This involves registering signature data with the kernel, verifying that the data is internally consistent and cryptographically valid. If the signature data is not internally consistent, not cryptographically valid, or not signed by a trusted entity, the operating system may not allow the process (or library) to load. The policy can differ on different operating systems, but the dynamic code signature requirement constitutes another example of a global launch requirement in that it applies globally to all processes. This use of code signatures again differs from the use of per-process launch constraints, which constitute fine-grained rules that can be set on individual binaries, in contrast to system-level sets of rules. The proposed type of launch constraints allows a way to impose code signing-related restrictions on the parent-child relationship between processes. Note that code signing also protects only the code itself, not other environmental factors that have been discussed.

Similarly, there may be additional dynamic code signing activity at 330, post-launch. That is, while a process is running, additional pages from disk may be brought in to the virtual memory system as needed. The operating system may, as part of this ongoing process, perform additional code signing checks on the requested pages before loading those pages.

Additional post-launch checks may be performed by the operating system on the process at 340. For example, from time to time, there may be non-code files on disk whose signatures need to be checked. Such checks may be used to determine whether the launched process constitutes malware.

To restate, launch is an operation performed by the operating system to create a process from a file on disk. The launch operation turns data on disk into code that can run and be scheduled. By the nature of the operation, there will be some other process (i.e., the parent process) that causes the launch of the new process (i.e., the child process). Note that, in some operating systems, there is also the concept of a "responsible process" for a particular child process. In such operating systems, various ways to open an application consist of a first process sending a message to a second process (e.g., launchd), which ends up launching a third process. Accordingly, in such scenarios, the first process is the responsible process, the second process is the parent process, and the third process is the child process. As will be described, in some implementations, launch constraints may be set that relate to the parent process, the child process, and/or the responsible process (if applicable).

The proposed paradigm of launch constraints contemplates that a wide variety of specific constraints are possible. Various constraints include code signing properties of a process or file, how a process is protected on disk, the state of the system, etc. Many more possibilities are described below. As noted, in some cases, launch constraints can be embedded into the binaries themselves.

There are various ways of specifying launch constraints to the kernel. One possible approach (which can be referred to as a "lightweight code requirements" language) is described below with respect to FIGS. 4A-H. This language can be specified using key-value pairs.

FIG. 4A depicts one implementation of a top level for such a language. As shown, table 400 includes a number of key-value pairs in columns 401 and 402. The value for the "ccat" key specifies a constraint category, which can be either a default setting (0) or a canned requirement dictionary (discussed below). The value for the "comp" key specifies backwards compatibility (if any) for the version of the language, while the value of the "vers" key specifies the current language version.

The value of the "reqs" key specifies a requirements dictionary. A requirements dictionary, in this implementation, includes a set of key-value pairs that are used to specify fine-grained launch constraints. Each key is acted on independently to determine whether it is satisfied by the environment. In one implementation, the top-level dictionary implicitly signifies an AND operation. Thus, all top-level keys must be satisfied for the overall constraint to be met.

In one embodiment, keys can be "fact names" or operators. Facts are the questions that can currently be asked about a process, its location, or the system on which it is running. Each fact has an expected type. Operators can be used as values to indicate that multiple values may satisfy the constraint.

Table 410 in FIG. 4B illustrates various fact names. The fact name in row 411 is true when the operating system running on the computer system is an internal product. The fact in row 412 relates to an entitlements query dictionary, which includes information relating to process entitlements. The fact in row 413 is true when code in found in a particular version of a trust cache. The fact in row 414 is true when the queried process is the "init" process (i.e., launchd). The fact in row 415 is true when the binary has a particular flag set on the file system.

The fact in row 416 is meaningful in the context of the child process. (The relevant operators are discussed below.) This fact can match when the parent process sets the expected launch type via an attribute of a spawn system call.

The facts in row 417 and 418 are set when the binary of the process being matched resides on the system volume (as opposed to, say, a data volume). The fact in row 419 is matched when the signing identifier of the process matches the supplied string or satisfies the supplied operator. The fact in row 420 is met when System Integrity Protection (SIP) is enabled for the system. The facts in rows 421 and 422 relate to particular team identifier (e.g., a particular company) and a particular validation category (e.g., development, App Store), respectively.

Operators, in one implementation, can be used to make more complex checks than just simple equality. Operators can match on various values and data structures, including integers, dictionaries, and arrays. Dictionaries can include facts or operations, while arrays may include multiples integers or strings.

Some operators refer to a fact, while others do not. One example of an operator that refers to a fact is {"signing-identifier":{"$in":["foo", "bar"]}}. The $in operator refers to the system value "signing-identifier" fact to match its values. This expression will be true if "signing-identifier" includes either "foo" or "bar." An example of an operator that does not refer to a fact is {"$or":{"validation-category": 1, "internal":True}}. The $or operator does not refer to any fact, as indicated by the operator being to the left of the ":". The $or operator in this expression is met if any of the facts/operations on the right side of the ":" are satisfied.

A list of example operators is given in table 430 in FIG. 4C. The $and operator in row 431 and the $or operator in row 438 implement Boolean functions on a dictionary data structure. The $gt, $gte, $lt, and $lte operators in rows 432, 433, 435, and 436 perform inequality testing between a system value and a supplied integer. The $in operator in row 434 allows querying an array of strings or integers to see if there is a match between the system value of the fact and any value in the array. The $optional operator in row 437 is used to test whether a fact is matched or is unknown to a particular operating system. The $query operator in row 439 relates to entitlement query arrays, discussed next.

As used herein, an "entitlement" refers to the conferral of specific capabilities or security permissions to an application. A given entitlement has a default value, which in many cases disables the capability associated with the entitlement. For example, entitlements may enable the use of cloud storage, in-app purchases, push notifications from an app when the app is not executing, etc. Entitled executables derive their privilege from their code identity, not from blessing of their filesystem node. Entitled executables can be copied (even between systems) by an unprivileged user while retaining their privilege. Launch constraints allow a privileged executable to customize its policy, and to make this policy part of its code identity—for example, to specify that only certain users may execute it or that the executable must be protected by the System Integrity Protection (SIP) on disk.

Entitlements are added to executables largely at the discretion of individual developers. If an entitlement is added to an unsuitable executable, revoking the entitlement is not currently feasible. No effective mechanism exists for specifying policy about the contexts in which a particular entitlement may be used. The proposed launch constraint paradigm introduces a mechanism for reducing the attack surface exposed by an improperly selected entitlement.

In one implementation, entitlement query arrays are a specific type of data structure for storing information about entitlements held by a particular application. They may be structured as an array of tuples (two-element arrays). Each tuple specifies an operation followed by a value. Operations are specified by OpCode(integer). In one implementation, the top-level array is a sequence of Select operations followed by a single Match operation. Sample select operations are defined in table 440 FIG. 4D, while sample match operations are defined in table 550 FIG. 4E.

To illustrate the use of select and match operations, FIG. 4F includes a sample entitlements dictionary 460. The key "application-identifier" has the value "com.foo.bar." The key "my-dict" specifies an entitlements dictionary that has two keys: "my-key-1" (specifying integer values) and "my-key-2" (specifying a Boolean value). These keys include information about entitlements of the application "com.foo.bar".

FIG. 4F next includes five example match queries against entitlements dictionary 460. Query 1 (462) includes op code 1, which selects a key corresponding to the application identifier, followed by op code 3, which matches on an exact string value. In this case, the value "com.foo.bar" is matched exactly as specified by the op code, and thus the query is a match.

Query 2 (464) includes a select operation with op code 9, which is intended the longest entitlement key with the specified prefix. Op code 9 does not match anything, so the ensuing Boolean match operator (op code 5) is therefore never run. Query 3 (466) selects my-key-1 within dictionary my-dict, and then selects index 2 into the corresponding array. My-key 1 has the following indexes/values: index 0=1; index 1=2; index 2=3. The match operator indicated by op code 7 attempts to match an exact integer, in this case "3." Because the integer 3 is located at index 2 in my-key-1, query 3 is a match.

Query 4 (468) selects my-key-2 within dictionary my-dict, and then attempts to match based on the type of the value stored at my-key-2. (This type of match is specified by opcode 11, followed by 5, which indicates a Boolean value.) Because my-key-2 does, in fact, store a Boolean value, this query is a match. Query 5 (470) is also a match. This query selects my-key-1 within my-dict dictionary, and then, based on the match operator for op code 10, checks the array at my-key-1 for a match on integer 2. Because this array includes 2, this is a match.

As has been noted, launch constraints can also be used in conjunction with the practice of code signing. Table 480 in FIG. 4G illustrates that launch constraints may be assigned for the child process, the parent process, and the responsible process, as well as a constraint category to be assigned to the binary.

Example 490 in FIG. 4H includes an example of a code signing block that includes launch constraints 492. The constraint category is 0, the value of the comp key is 1, and the value of the vers key is 1. The requirements dictionary includes three launch constraints. The first is specified by the $or operator, which is satisfied if the binary resides on an AuthAPFS volume or a system volume. The second launch constraint deals with launch type, and is true if the child process (i.e., the one being launched) is a system service (value 1). Finally, the third launch constraint concerns the validation category, and is satisfied if the process has platform validation.

FIG. 4B described various different launch constraints, but this is by no means an exhaustive list. Additional possible types of launch constraints are now described with respect to FIGS. 5A-F. In these figures, constraints are specified in a "property list" (plist)-type language that also uses dictionaries and arrays, as well as prefixes that affect the context in which a particular constraint is evaluated. For example, a particular launch constraint might be evaluated in the context of a parent process (prefix=parent) or a child process (prefix=child.). For example, the following plist specifies that the subject executable may be executed either by launchd as a system daemon or by exec/spawn, but only in the latter case by the SIP protected path /usr/bin/csrutil: [{'launchmode': 'daemon', 'launchdomain': 'system', 'job-label': 'com.apple.csrutil.report'}, {'launchmode': ['exec', 'spawn'], 'execpath': '/usr/bin/csrutil', 'siptrusted': True}].

Table 500 in FIG. 5A illustrates possible launch constraints that are premised on an aspect of global system state. Broadly speaking, these constraints focus on either ensuring that a process is either launched when some system-wide property or mode is either present or not. Thus, for example, a tool that is intended only for use in a particular development mode can be prevented from being run in another setting.

Row 501 identifies a constraint that System Integrity Protection (SIP) must be disabled in order for the process to launch. Some executables built with sensitive privileges are intended exclusively for internal use. By adding a launch condition such as in row 502 (which matches true on internal OSes), the system can easily enforce that the executable does not negatively impact end-user security if it leaks as part of an internal build. Implementation as a launch constraint is preferable to a manual CSR check at the beginning of main( ), in that it can be statically tested for and implementation mistakes can be eliminated.

Row 503 requires that a specified data protection class (A or C) must be available in order to launch. Data protection classes, in some operating system embodiments, refer to classes that are assigned to a file by the app that created the file. Each class uses different policies to determine when the data is accessible. Other launch constraints refer to particular modes. Row 504 requires that developer mode must be enabled. Generally speaking, a developer mode is a mode that permits greater control of a computing device, perhaps allowing installation of custom boot software, or certain debugging modes. Another special mode is single-user mode, which can enable a single superuser for a computing device. Row 505 describes a launch constraint that either requires or prohibits such a mode. Still further, rows 506 and 507 describe launch constraints relating to the nature of the kernel (development and production kernels, respectively). Of course, many different possibilities exist for global system state, operating mode, etc. in other embodiments. For example, a particular launch constraint might either require or prohibit launch during a system recovery mode.

While FIG. 5A lists various system-wide modes that can serve as the basis of a launch constraint, table 510 in FIG. 5B focuses on launch constraints relating to the manner or context in which a particular process is being launched.

Rows 511-519 relate to different launch modes. In certain operating systems, "launchd" (or "init") is a process used by the kernel to manage daemons and agents. As is understood, a daemon is a program that runs in the background without requiring user input. A daemon might be commonly used to perform daily maintenance tasks. The launchd process differentiates between daemons (which run on behalf of the root user or some specified user) and agents (which run on behalf of the logged-in user). Rows 511 and 512 describe launch constraints that require a particular binary to be launched, respectively, as either a daemon or agent. Most launchd executables are not intended to ever be invoked directly or by any other process than launchd. A constraint ensuring launchmode=daemon or launch-mode=agent for the executables referenced by job plists would ensure that they cannot be directly invoked. Only a few exceptions exist (tools that act both as command line tools and daemons). In some operating systems, there are hundreds of LaunchAgent and LaunchDaemon executables with entitlements residing in /System, /usr/libexec, or ending in "d", suggesting that they are not intended to be run directly by the user. The proposed launch constraints would greatly secure the invocation of such executables.

Similar functionality is captured in rows 513 and 514, which deal with XPC services (relating to interprocess communications) and app extensions (which extend app functionality to other aspects of the system). XPC services can suffer from recomposition vulnerabilities. An XPC service accepts requests via interprocess communication mechanisms. Those XPC service may have privileges. A common use for XPC services is to do some work that requires extra privileges when the main executable may be subject to attack. The assumption is that the XPC services can validate their input better than the main executable and thus can be more trusted to do its job. A recomposition attack occurs when an XPC service does a poor job validating its input (or the process that calls it), such that some other process can improperly use the XPC service to do a privileged thing. A service bundle may be extracted from its containing bundle and inserted into a malicious app's domain from where it may be abused (unless certain precautions are taken). Furthermore, the executable may be extracted from the containing bundle (or argv0 may be spoofed) to inject malicious resources. Finally, the XPC service executable may be directly invoked in order to influence its environment (e.g., to spoof the boot-strap port). Launch constraints can close down a variety of these attacks. launchmode=xpc prevents any process except launchd in an XPC service context from executing the executable, protecting against a variety of resource injection attacks, for any XPC service (whether in the operating system or not). For XPC services that ship with the operating system, siptrusted=true, argv0=execpath, and execpath=<path> may be set to prevent attacks based on relocating the executable or otherwise spoofing its location on disk.

Various other aspects of launch are also covered, including being launched as a user app (row 515), spawned by launchd generally (row 516), being launched by a particular process (e.g., lockdownd, row 517). Launch constraints can also specify that a particular command is employed for the launch—for example, exec (row 518) or posix_spawn (row 519). Relatedly, a launch constraint can specify not only the launching entity, but also the location of the binary. See row 520 (launched by launchd; installed in /System directory), row 521 (installed in /Library directory), row 522 (installed in user Library), and row 523 (XPC service or app extension embedded in an app). Rows 524-528 set forth various other specific restrictions relating to invocation context.

Table 530 in FIG. 5C lists several launch constraints that match on properties of the parent process.

Row 531 specifies that the parent process must have some specified user id. Rows 532 and 533, on the other hand, relate to sandboxing. Row 532 is used to specify that the parent process must not be sandboxed, while row 533 is used to specify a particular sandbox is being used.

Table 540 in FIG. 5D, on the other hand, lists launch constraints that focus on properties inherited by the child process. Row 541 specifies that the child process must be executed with a particular user id. Row 542 specifies a launch constraint that prohibits the child process from inheriting a sandbox. Row 543 requires launching within some sandbox (unspecified), while row 544 requires a particular sandbox that is specified in the launch constraint.

Rows 545 and 546 relate to environment variables of the child process. Environment variables contain system-wide values that can be used by any user and process under the operating system. Examples include the name of the current user, the name of the host computer, and the default paths to any commands. The launch constraint in row 545 includes a dictionary with a set of environment variables. All of the listed environment variables must have the specified values in order to launch, although other environment variables may also be set. Row 546, on the other hand, specifies a dictionary that is a closed set of environment variables. The specified values must be present in the child environment in order to launch, and no other variables are permitted to be set.

Figure 5E:
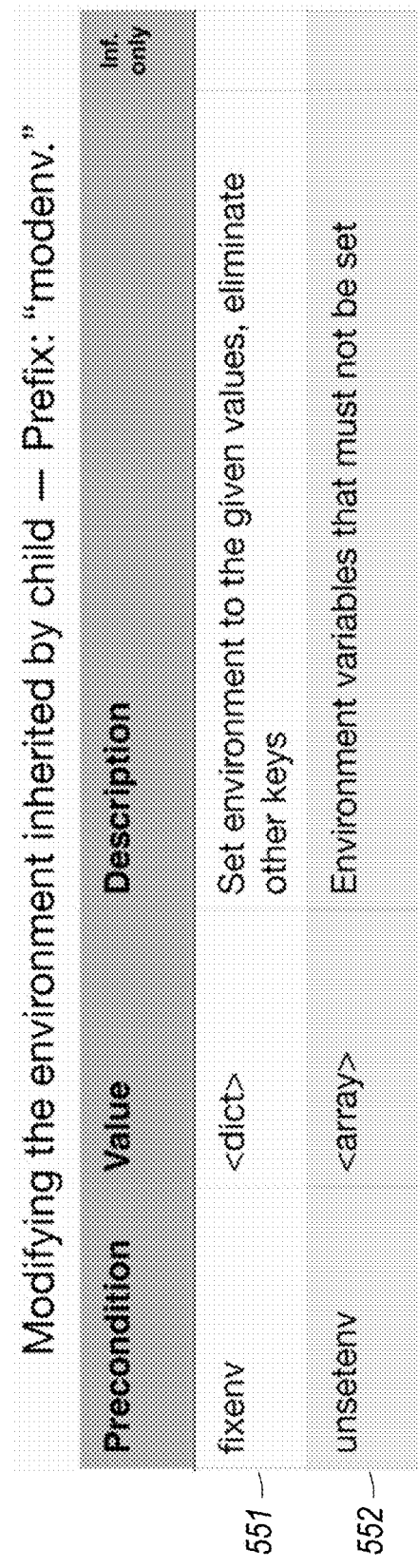

Table 550 in FIG. 5E includes further constraints relating to the environment of the child process. Row 551 specifies a constraint that passes a dictionary of environment variables. The launch module, in response, will actually set the environment variables according to the dictionary, eliminate other values, and then launch the process. Row 552 specifies a launch constraint that includes an array of environment variables that must not be set. Accordingly, the launch module can read the array, unset any specified variables, and then permit the launch. Alternately, the launch module can prevent launch if any of the specified variables are set.

Finally, table 560 in FIG. 5F lists a host of launch constraints that relate to properties of the child process. The constraint in row 561 relates to setuid executables, which allow execution by users with the privileges of the file's owner. This constraint can either require or prohibit a particular binary to be a setuid executable. The constraint in row 562 is similar, but relates to a setgid executable, which executes with the group ID of the file's group.

The constraint in row 563 relates to the exec path, specifying that the binary must execute from the specified path. Consider the use of symbolic links, or sym links, which contain a reference to another file or directory in the form of an absolute or relative path and affect pathname resolution. Suppose you have a path /a/b/c, where any portion of this path could be a symlink. For example, if "a" is a symlink that points to a directory . . . /f, then/a/b/c, when executed, actually points to /f/b/c. The constraint in row 563 may require that a specified path (e.g., /a/b/c) is really /a/b/c and not some other path (e.g., /f/b/c).

The constraints in rows 564 and 565 relate to how command line arguments are passed to the main( ) function in a binary. The constraint in row 566 specifies that a particular binary is in a disk location that was protected by SIP from runtime manipulation.

The constraint in row 567 requires that the binary must reside on a read-only system partition, while the constraint in row 568 allows specification of whether the binary is (or is not) a platform executable. The constraint in row 569 relates to requiring execution from a particular type of cryptographically sealed directory structure. The constraint in row 570 can specify a set of POSIX permissions for owner, group, and other. The child process must have the specified permissions.

The constraint at row 571 ensures the process runs with process id 1. This ensures that launchd is not run in some other setting. The constraints at rows 572 and 573 require the presence of various security features. Rows 574 and 575 relate to various SIP settings. Row 576 allows a developer to specify whether or not the parent process has passed in child conditions or not. Finally, the constraints in row 580-582 relate to various aspects of code signing.

A wide variety of possible launch constraints have been described with respect to FIGS. 4A-H and 5A-F. In principle, even more launch constraints are possible. Generally speaking, as a design consideration, there may be a decision to weigh the latency of making a determination of querying some particular system resource 126 as a source of truth against the utility of such a check. In some implementations, a particular query may be deemed "too expensive" to make—for example, determining whether launch is requested on a system that has access to certain functionality (as opposed to a more restricted network). But in other implementations, such a query may be appropriate. Thus, for some types of launches, these so-called expensive queries may be performed.

The range of further launch constraints is extremely broad. For example, certain constraints might require user biometric checking before launch (e.g., one might require a user to touch a touch sensor ID button before a process such as a banking application will launch). Other constraints might force a process to launch on particular operating system versions to avoid known flaws in certain versions. Still other constraints might reference motion sensors. For example, in order to combat a background process that runs to figure out what keys have been pressed based on accelerometer measurements, a launch constraint might be employed that prevents the launch of certain processes if the accelerometer output indicates that some threshold amount of motion has occurred. In a similar vein, accelerometer output indicating motion might be used to block the launch of certain applications (e.g., texting or messaging apps) while driving. Other constraints might be based on whether or not certain input/output devices are active or not (e.g., camera, microphone, etc.). For example, a work application that includes sensitive data might use launch constraints to prohibit launch if certain peripherals such as an external SSD is currently connected. Similarly, an app performing an action that should not be interrupted (e.g., when installing an important security update) might be prevented from launching unless its device has a particular amount of battery level or connection to a wall charger. Network status might also provide the basis for launch constraints. Thus, a data-hungry application might be able to launch only when the device has Wi-Fi access as opposed to just cellular access. In a similar vein, an app might not be able to launch unless its device is connected to a particular network such as the employer's Wi-Fi network or a specified VPN connection. Additional examples include sensor availability, current geographic location, system health, hardware health, network health, status of security hardware such as a secure enclave processor (SEP), status of biometric sensors, network connections, user age determination, etc. In short, the state of any system resource or value that is verifiable by or on behalf of the kernel can act as a source of truth for a launch constraint.

The preceding discussion has made clear that the use of launch constraints can increase system security by preventing certain processes from being launched in unexpected or unintended ways. But it is important to understand that the utility of launch constraints extends beyond security. Process launch constraints are well suited for a regulatory setting for example. Consider a gambling application that is only intended to be used in settings where gambling is legal. A launch constraint on the binary of the gambling application might require that the current geolocation of the corresponding computing device be located within certain predefined regions in which that form of gambling is legal (e.g., Las Vegas). Similarly, an application intended for adults could launch only in response to an age verification by the system. Still further, in the context of a mission-critical device, a launch constraint might ensure that sensors have passed a hardware integrity test before an application is permitted to launch. Thus, launch constraints are in no way limited to use for security reasons, and can be employed for reasons related to regulations, compliance, safety, power management, and the like.

FIG. 6 is a flow diagram of one embodiment of a method 600 performed by a kernel of an operating system executing on a computer system to implement launch constraints.

Method 600 begins in 610, in which the kernel receives a request from a parent process to launch a child process that executes a binary having a specified path. In some embodiments, the request can be an exec system call such as execl, execle, execlp, execv, execve, execvp, etc. In other embodiments, the request can be a spawn system call. The path can be specified either explicitly or via a default path. The binary can be part of the operating system or a third-party application (e.g., an application produced by a developer not affiliated with the entity that developed the operating system).

In 620, the kernel identifies a set of launch constraints for the child process. The set of launch constraints specify one or more preconditions for launching the child process. The launch constraints can be specified to the kernel in various ways. The child process can specify the set of launch constraints within the binary (typically as part of a code signature). In other cases, the set of launch constraints is included in a trust cache located in kernel memory space. A code signature of the binary can be used to locate the set of launch constraints within the trust cache. A parent process can specify the set of launch constraints for the child process in an argument of the request. For example, a spawn system call might include, as an argument, a pointer to a data structure that includes the set of launch constraints. The kernel can then use this pointer to access the set of launch constraints to perform the launch operation.

Next, in 630, the kernel evaluates the one or more preconditions specified by the set of launch constraints. The set of launch constraints can include a single launch constraint or multiple launch constraints (which may be joined by Boolean operators to allow complex specifications of constraints). This can be performed in a variety of ways, such as by querying some system resource to ascertain a current state of the computer system. There is a wide variety of possible launch constraints. Thus, evaluation might include determining a particular volume on which the child process is to be launched from. In other cases, the evaluation might include determining the parent process of the child process to be launched. Still further, the evaluation might include determining the manner in which the binary is signed (operating system certificate, development certificate, etc.). The set of launch constraints can specify constraints on aspects of one or more of the following processes: the parent process, the child process, and the responsible process (if applicable). Launch constraints can also involve checking the state of various types of system hardware—for example, one possible launch constraint is that a plurality of sensors of the computer system have passed a hardware integrity check.

In 640, the kernel determines whether to launch the child process based on the evaluated one or more preconditions. When the child process is launched, this action now permits the child process to be scheduled for execution by the operating system. This operation stands in contrast to a static code signing procedure, which can check a code signature of the binary but does not launch (or attempt to launch) a process after checking that certain preconditions are met. Similarly, launch constraints differ from post-launch code signing operations on pages of the binary that are brought in to virtual memory of the computer system.

Method 600 may further include, in some embodiments, the kernel checking a set of global launch requirements for the request. The set of global launch requirements apply to all processes being launched, unlike the set of launch constraints, which apply to specific processes/binaries. If one of the set of global launch requirements fails, the kernel can report a failure. The set of global launch requirements may include one or more requirements of the following set: a specified path to the binary does not exist, the parent process does not have permission to access or execute the specified path, the binary does not have executable permission, the binary is not in a format executable by the kernel, the computer system does not have current capacity to execute the child process. The set of global launch requirements may also include a set of requirements relating to code signatures for the binary.

Method 600 and the described variations can be implemented by program instructions stored on a non-transitory computer-readable storage medium that are capable of being executed by a computer system. (Note that in some cases, program instructions may be stored on a storage medium but not enabled to execute in a particular computing environment—the recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a computer system that implements the methods described with respect to FIG. 6 is also contemplated.

FIG. 7 is a flow diagram of one embodiment of a method 700 performed by a user process executing on a computer system. Method 700 begins in 710, in which the user process stores a set of launch constraints in a launch constraint data structure. The set of launch constraints specify one or more preconditions for launching a child process of the user process.

Next, in 720, the process sends, to the kernel of an operating system of the computer system, a spawn request for a child process, where the spawn request includes a reference to the launch constraint data structure. For example, the spawn request can be a posix_spawn call that includes, as an argument, a pointer to a data structure organized to store the set of launch constraints. The kernel to which the spawn request is sent is executable to perform an evaluation of the one or more preconditions, and launch the child process only in response to determining, based on the evaluation, that the set of launch constraints is satisfied. Launching the child process permits the child process to be scheduled for execution by the operating system. The kernel may also be executable, in response to the spawn request, to check a set of global launch requirements that are applicable to all system processes, and to report a failure for the spawn request in response to one or more of the global launch requirements not being satisfied.

Method 700 can be implemented by program instructions stored on a non-transitory computer-readable storage medium that are capable of being executed by a computer system. Similarly, a computer system that implements method 700 is also contemplated.

In the previously described embodiments, the proposed launch constraints operate to prevent process launch if specified preconditions are not met. But in alternate embodiments, launch might operate in a "report only" mode in which executables are allowed to run even if certain launch conditions are not satisfied. Instead, a message is logged that identifies the failed conditions. In such embodiments, the conditions are not properly called launch constraints. The conditions are evaluated and flagged, but process launch is not premised on the conditions being satisfied.

In some embodiments, certain constraints might be characterized as optional. This approach might be useful, for example, if a particular constraint were not valid (i.e., not applicable) in a particular version of the operating system. Thus, a set of constraints might be A and B and C (if applicable), where C is an optional constraint. If C were valid in a particular setting, that precondition will be evaluated as part of determining whether the set of launch constraints is satisfied. If C were not valid in a particular setting, however, that precondition will not be evaluated, and thus the set of constraints can be satisfied if just A and B are true. This allows a single set of constraints to be used in a variety of settings.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various software operations that are performed in the context of any computing device that uses an operating system to run and schedule processes. Such a computing device can be configured according to any known configuration of computer hardware. A typical hardware configuration includes a processor subsystem, memory, and one or more I/O devices coupled via an interconnect. A given computing device may also be implemented as two or more computer systems operating together.

The processor subsystem of the computing device may include one or more processors or processing units. In some embodiments of the computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the computing device is usable to store program instructions executable by the processor subsystem to cause the computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the computing device is not limited to primary storage. Rather, the computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory, computer-readable medium storing program instructions that, when executed by a computer system, cause the computer system to perform operations comprising:

receiving, by a kernel of an operating system executing on the computer system, a request from a parent process to launch a child process that executes a binary;

identifying, by the kernel in response to receiving the request, a set of launch constraints for the child process that are specific to the request, the set of launch constraints specifying one or more preconditions for launching the child process, wherein the set of launch constraints is distinct from a set of global launch requirements for the request, the set of global launch requirements being applicable to all system processes;

evaluating, by the kernel, the one or more preconditions; and determining, by the kernel, whether to launch the child process based on the evaluated one or more preconditions, wherein launching the child process permits the child process to be scheduled for execution by the operating system.

2. The computer-readable medium of claim 1, wherein the request is an exec system call.

3. The computer-readable medium of claim 1, wherein the request is a spawn system call, and wherein the set of launch constraints is specified in a launch constraint argument of the request.

4. The computer-readable medium of claim 1, wherein the set of launch constraints is included in the binary, and wherein the binary is signed.

5. The computer-readable medium of claim 1, wherein the set of launch constraints is included in a trust cache located in kernel memory space.

6. The computer-readable medium of claim 5, wherein the binary is signed by a signature, and wherein the signature is usable by the kernel to look up the set of launch constraints in the trust cache.

7. The computer-readable medium of claim 1, wherein the operations further comprise:

performing, prior to receiving the request, static checking of code signatures for a file that includes the binary; and performing, after initiating launch of the child process, dynamic checking of code signatures for pages of the binary brought into virtual memory of the computer system.

8. The computer-readable medium of claim 1, wherein the set of launch constraints requires launching from a particular volume.

9. The computer-readable medium of claim 1, wherein the set of launch constraints requires that the parent process be a particular process.

10. The computer-readable medium of claim 1, wherein the set of launch constraints specifies constraints on a responsible process.

11. The computer-readable medium of claim 10, wherein the set of launch constraints further specifies constraints on the parent process and the child process.

12. The computer-readable medium of claim 1, wherein the operations further comprise:

checking, by the kernel, the set of global launch requirements for the request; and reporting, by the kernel, a failure for the request in response to one or more of the global launch requirements not being satisfied.

13. A method, comprising:

receiving, by a kernel of an operating system executing on a computer system, a request from a parent process to launch a child process;

identifying, by the kernel in response to receiving the request, a set of launch constraints for the child process that are specific to the request, the set of launch constraints specifying one or more preconditions for launching the child process, wherein the set of launch constraints is distinct from a set of global launch requirements for the request, the set of global launch requirements being applicable to all system processes;

evaluating, by the kernel, the one or more preconditions; and determining, by the kernel, whether to launch the child process based on the evaluated one or more preconditions, wherein launching the child process permits the child process to be scheduled for execution by the operating system.

14. The method of claim 13, wherein the set of launch constraints specifies a manner in which a binary for the child process is signed.

15. The method of claim 13, wherein the set of global launch requirements includes one or more requirements of the following set: a specified path to a binary for the child process does not exist, the parent process does not have permission to access or execute the specified path, the binary does not have executable permission, the binary is not in a format executable by the kernel, the computer system does not have current capacity to execute the child process.

16. The method of claim 13, wherein the set of launch constraints is formatted as a dictionary having a plurality of key-value pairs, wherein the plurality of key-value pairs includes at least one operator key specifying a logical operation to be performed on a system value.

17. A computer system, comprising:

a memory; and a processor circuit configured to execute program instructions stored in the memory to perform operations comprising:

receiving, by a kernel of an operating system executing on the computer system, a request from a parent process to launch a child process;

identifying, by the kernel in response to receiving the request, a set of launch constraints for the child process that are specific to the request, the set of launch constraints specifying one or more preconditions for launching the child process, wherein the set of launch constraints is distinct from a set of global launch requirements for the request, the set of global launch requirements being applicable to all system processes;

evaluating, by the kernel, the one or more preconditions; and determining, by the kernel, whether to launch the child process based on the evaluated one or more preconditions, wherein launching the child process permits the child process to be scheduled for execution by the operating system.

18. The computer system of claim 17, wherein the set of launch constraints is included in a binary for the child process, and wherein the binary is signed.

19. The computer system of claim 17, wherein the set of launch constraints is included in a trust cache located in kernel memory space.

20. The computer system of claim 17, wherein the operations further comprise:

checking, by the kernel, the set of global launch requirements for the request; and reporting, by the kernel, a failure for the request in response to one or more of the global launch requirements not being satisfied.

* * * * *